(12) United States Patent
Kezuka et al.

(10) Patent No.: US 11,999,627 B2
(45) Date of Patent: Jun. 4, 2024

(54) CALCIUM CARBONATE WITH CONTROLLED PARTICLE MORPHOLOGY, METHOD FOR PRODUCING THE SAME, AND CRYSTAL GROWTH METHOD

(71) Applicant: SHIRAISHI CENTRAL LABORATORIES Co., Ltd., Amagasaki (JP)

(72) Inventors: Yuki Kezuka, Amagasaki (JP); Maya Yoshida, Amagasaki (JP)

(73) Assignee: SHIRAISHI CENTRAL LABORATORIES CO., LTD., Amagasaki (JP)

( * ) Notice: Subject to any disclaimer, the term of this patent is extended or adjusted under 35 U.S.C. 154(b) by 206 days.

(21) Appl. No.: 17/510,725

(22) Filed: Oct. 26, 2021

(65) Prior Publication Data

US 2022/0144659 A1    May 12, 2022

(30) Foreign Application Priority Data

Nov. 6, 2020 (JP) ................ 2020-185757

(51) Int. Cl.
*C01F 11/18* (2006.01)
*C08K 3/26* (2006.01)
*C08L 57/00* (2006.01)
*C08L 87/00* (2006.01)

(52) U.S. Cl.
CPC ............. *C01F 11/185* (2013.01); *C08K 3/26* (2013.01); *C08L 57/00* (2013.01); *C08L 87/00* (2013.01); *C01P 2004/64* (2013.01); *C01P 2006/12* (2013.01); *C08K 2003/265* (2013.01)

(58) Field of Classification Search
CPC ... C01F 11/185; C08K 3/26; C08K 2003/265; C08L 57/00; C08L 87/00; C01P 2004/64; C01P 2006/12
See application file for complete search history.

(56) References Cited

U.S. PATENT DOCUMENTS 5,215,734 A * 6/1993 Kunesh ................ D21H 21/52
423/430

FOREIGN PATENT DOCUMENTS

| CN | 106564923 A | 4/2017 |
|----|-------------|--------|
| JP | 2013-203581 A | 10/2013 |
| JP | 2017-500270 A | 1/2017 |
| JP | 2018-510108 A | 4/2018 |

OTHER PUBLICATIONS

Office Action dated Mar. 9, 2021, issued in counterpart JP application No. 2020-185757, with English translation. (6 pages).

* cited by examiner

*Primary Examiner* — Sheng H Davis
*Assistant Examiner* — Catriona M Corallo
(74) *Attorney, Agent, or Firm* — WHDA, LLP

(57) ABSTRACT

Provided is a calcium carbonate that comprises crystals having a particular shape and structure and has a nano-order average particle size. Provided are a method for producing a calcium carbonate that comprises crystals having a particular shape and structure and has an average particle size in a particular range and a crystal growth method. The calcium carbonate has the calcite structure, has a BET specific surface area of 2 to 50 $m^2/g$, has a number-based average particle size of 30 nm to 1.0 μm as determined by electron microscopy, and partially comprises substantially ring-like particles.

18 Claims, 4 Drawing Sheets

CALCIUM CARBONATE WITH CONTROLLED PARTICLE MORPHOLOGY, METHOD FOR PRODUCING THE SAME, AND CRYSTAL GROWTH METHOD

BACKGROUND

1. Technical Field

The present invention relates to a calcium carbonate with controlled particle morphology, a method for producing the calcium carbonate, and a crystal growth method.

2. Description of the Background

Calcium carbonate ($CaCO_3$) is widely used as a base material or a loading material of various industrial products and is also widely used in the fields of agriculture and food. Calcium carbonate is produced by blowing carbon dioxide into an aqueous calcium hydroxide solution or by mixing an aqueous solution of a soluble calcium salt such as calcium chloride with an aqueous solution of a soluble carbonate such as sodium carbonate. As another production method, Shiraishi method has been widely known. In the method, limestone ($CaCO_3$) is subjected to calcination and decarbonation to give quick lime (CaO), which is reacted with water to give lime milk (aqueous suspension of $CaOH_2$). Into the lime milk, the carbon dioxide generated during the calcination is introduced to yield calcium carbonate in the liquid.

To separately produce calcium carbonates each having an intended particle size or an intended crystal shape depending on the application, various studies have been conducted. Calcium carbonate has structural polymorphs such as calcite crystals, aragonite crystals, and vaterite crystals, and methods of separately producing these crystals have also been disclosed. For example, Patent Document 1 (JP 2013-203581 A) discloses a method for producing aragonite calcium carbonate. Patent Document 2 (JP 2018-510108 A) discloses a process of converting gypsum into precipitated calcium carbonate. In the process, a mixture containing gypsum and a seed, a mineral acid, or both is reacted with at least one carbonate source to directly yield precipitated calcium carbonate in the form of calcite and/or aragonite without conversion from a vaterite polymorph. Patent Document 3 (JP 2017-500270 A) discloses a method for producing nano silicon dioxide and nano calcium carbonate by using rice hull ash and flue gas of a biomass power plant.

BRIEF SUMMARY

As described above, various methods for producing calcium carbonates having different particle sizes or different crystal shapes have been disclosed. However, there is still a strong demand for a method capable of efficiently producing a calcium carbonate having a particle size of about 1 to 100 nm or what is called a nanoscale size.

The present invention is therefore intended to provide a calcium carbonate comprising crystals having a particular shape and structure and having a nano-order average particle size. The present invention is further intended to provide a method for producing a calcium carbonate that comprises crystals having a particular shape and structure and has an average particle size in a particular range and to provide a crystal growth method.

A calcium carbonate having the calcite structure, having a BET specific surface area of 2 to 50 $m^2/g$, and having a number-based average particle size of 30 nm to 1.0 μm as determined by electron microscopy, the calcium carbonate partially comprising substantially ring-like particles.

A resin composition comprising:
a resin; and
the calcium carbonate according to the present invention.

A method for producing a calcium carbonate containing substantially ring-like particles, the method comprising the steps of:
adding carbon dioxide to an aqueous calcium carbonate dispersion under atmospheric pressure to reduce a pH of the aqueous calcium carbonate dispersion to 9.0 or less; and then
increasing the pH of the aqueous calcium carbonate dispersion to grow calcium carbonate particles.

A method for growing crystals of a calcium carbonate containing substantially ring-like particles, the method comprising the steps of:
adding carbon dioxide to an aqueous calcium carbonate dispersion under atmospheric pressure to reduce a pH of the aqueous calcium carbonate dispersion to 9.0 or less; and then
increasing the pH of the aqueous calcium carbonate dispersion to grow calcium carbonate particles.

According to the present invention, a calcium carbonate having the calcite structure, containing substantially ring-like crystals, and having a nano-order average particle size can be provided. According to the present invention, a novel method for producing a calcium carbonate comprising calcite crystals having such a specific shape and a novel crystal growth method can be provided.

DETAILED DESCRIPTION

Figure 1:
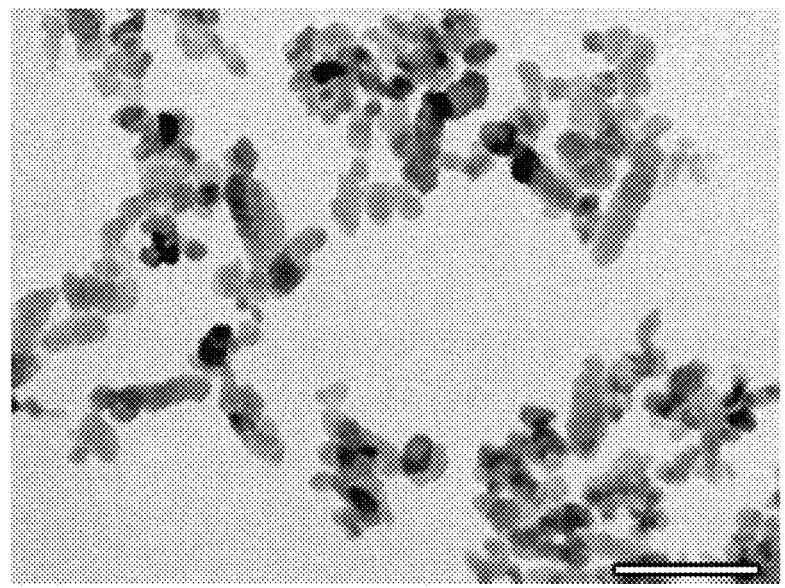
FIG. 1 is an electron micrograph of calcium carbonate particles in an aqueous calcium carbonate dispersion before heating.

Embodiments of the present invention will be described in further detail, but the present invention is not intended to be limited to the following embodiments.

A first embodiment relates to a calcium carbonate having the calcite structure, having a BET specific surface area of 2 to 50 $m^2/g$, and having a number-based average particle size of 30 nm to 1.0 μm as determined by electron microscopy. In the present embodiment, the calcium carbonate is characterized by partially comprising substantially ring-like particles.

In the embodiment, the calcium carbonate is a carbonate of calcium represented by the composition formula, $CaCO_3$, and is the main component of seashells, eggshells, limestone, chalk, and the like. Calcium carbonate is classified into ground calcium carbonate (natural calcium carbonate) prepared by pulverization and classification of limestone and precipitated calcium carbonate (synthetic calcium carbonate) prepared by chemical reaction, and the calcium carbonate of the embodiment is synthetic calcium carbonate. Calcium carbonate has crystalline polymorphs including calcite crystals (trigonal rhombohedral crystals), aragonite crystals (orthorhombic crystals), and vaterite crystals (hexagonal crystals), and the calcium carbonate in the embodiment has the calcite structure. The calcite crystal is the form of a crystal typically produced as calcite and is most stable at normal temperature and pressure as compared with the other crystal forms.

The calcium carbonate in the embodiment preferably has a BET specific surface area of 2 to 50 $m^2/g$. The BET specific surface area can be determined as follows: gas molecules (such as nitrogen molecules) having a known adsorbate occupied area are allowed to adsorb to a substance; and the adsorption amount is calculated. The BET specific surface area of a calcium carbonate can be determined in accordance with "Determination of the specific surface area of powders (solids) by gas adsorption-BET method" in JIS Z 8830. The calcium carbonate used in the embodiment preferably has a BET specific surface area of 2 to 50 $m^2/g$, more preferably 5 to 45 $m^2/g$, and even more preferably 20 to 45 $m^2/g$.

The calcium carbonate in the embodiment preferably has a number-based average particle size of 30 nm to 1.0 μm as determined by electron microscopy. To determine particle sizes, some methods are known. In the present embodiment, particles are directly observed and measured under an electron microscope, and an average particle size is calculated from a particle size distribution based on the number. In the embodiment, a calcium carbonate having an average particle size of 30 nm to 1.0 μm means that the calcium carbonate mainly comprises calcium carbonate particles having nano-order particle sizes. The calcium carbonate in the embodiment preferably has an average particle size of 40 to 500 nm and more preferably 50 to 100 nm.

In the present embodiment, the calcium carbonate partially comprises substantially ring-like particles. In other words, the calcium carbonate in the embodiment comprises substantially ring-like primary particles. In the present description, the ring-like shape generally means a shape having a single pore (ring) and a shape having a cavity (hollow) and includes not only a circular shape and an annular shape but also polygonal shapes, such as a triangular shape and a quadrangular shape, each having a single pore or a cavity and a tubular shape. In the present description, the substantially ring-like shape includes not only a completely continuous ring-like shape but also an incompletely continuous ring-like shape such as a C shape. The calcium carbonate in the embodiment partially comprises substantially ring-like particles. The substantially ring-like calcium carbonate has a size of about 10 to 150 nm. The substantially ring-like particles of calcium carbonate are formed due to the production process of calcium carbonate described later. The calcium carbonate in the embodiment may comprise, in addition to the substantially ring-like particles, particles having spherical, substantially cubic, substantially rectangular parallelepipedic, substantially rhombohedral, spindle, acicular, and other shapes. The calcium carbonate in the embodiment may also comprise partially concave particles having spherical, substantially rectangular parallelepiped, and other shapes, or a shape having an incomplete pore, for example.

The calcium carbonate in the embodiment may be surface-treated with surface treatment agents selected from the group consisting of fatty acids and derivatives thereof, resin acids and derivatives thereof, silica, organic silicon compounds, condensed phosphoric acids, and condensed phosphates. Examples of the fatty acid include lower fatty acids such as acetic acid and butyric acid and higher fatty acids such as palmitic acid, stearic acid, oleic acid, linoleic acid, linolenic acid, arachidonic acid, eicosapentaenoic acid, and docosahexaenoic acid. Examples of the resin acid include acids derived from resins, such as abietic acid, neoabietic acid, palustric acid, pimaric acid, isopimaric acid, and dehydroabietic acid. Silica is a compound (silicon dioxide) represented by the composition formula, $SiO_2$. Examples of the organic silicon compound include a silane coupling agent in which a functional group (such as a vinyl group, an epoxy group, an amino group, a methacryl group, and a mercapto group) bonded to an organic material is bonded to a functional group (such as a methoxy group and an ethoxy group) bonded to an inorganic material through a silicon atom (Si) in a molecule. Examples of the condensed phosphoric acid include an inorganic polymer compound prepared by heating dehydration of orthophosphoric acid. These surface treatment agents may be used singly or in combination of two or more of them.

A second embodiment of the present invention is a resin composition comprising a resin and the calcium carbonate in the first embodiment. In the embodiment, the calcium carbonate can be added as an inorganic filler to a resin material. Calcium carbonate has a smaller specific gravity than those of conventionally used inorganic fillers such as barium sulfate and titanium oxide. Accordingly, the use of calcium carbonate as an inorganic filler can reduce the weight of a resin composition. The resin is preferably selected from the group consisting of elastomer resins and mixtures thereof, such as a polyolefin resin, a polyester resin composition, a polyarylate resin composition, and various diene resins. Elastomer resins such as a polyolefin resin, a polyester resin, a polyarylate resin, and a diene resin can be used singly or in combination of two or more of them. As long as the object of the present invention is not impaired, the composition can also comprise a resin other than elastomer resins such as a polyolefin resin, a polyester resin, a polyarylate resin, and a diene resin and mixtures thereof, as needed.

The polyolefin resin is a homopolymer and a copolymer prepared by polymerization of an olefin (alkene) or a cyclic olefin monomer and mixtures thereof. Examples of the polyolefin resin include polyethylene, polypropylene, poly (4-methylpentene-1), polybutene-1, poly(l-hexene), ethylene-tetracyclododecene copolymer, and polyacetal. The polyester resin is a polyester of a polycondensation product of a polyvalent carboxylic acid and a polyol and mixtures thereof. As the polyester resin, an aromatic polyester resin is preferably used. Examples of the aromatic polyester resin include polymethylene terephthalate resin (PTT), polyethylene terephthalate resin (PET), polypropylene terephthalate resin, polybutylene terephthalate resin (PBT), polyethylene naphthalate resin (PEN), polybutylene naphthalate resin (PBN), poly(cyclohexane-1,4-dimethylene-terephthalate) resin, and polytrimethylene terephthalate resin. Examples further include alkylene terephthalate copolymers containing an alkylene terephthalate building block as the main building block and polyalkylene terephthalate mixtures containing polyalkylene terephthalate as the main component. A mixture or a copolymer containing an elastomer component such as polyoxytetramethylene glycol (PTMG) may also be used. Examples of the polyalkylene terephthalate mixture include a mixture of PBT with a polyalkylene terephthalate other than PBT and a mixture of PBT with an alkylene terephthalate copolyester other than PBT. Of them, a mixture of PBT with PET, a mixture of PBT with polytrimethylene terephthalate, a mixture of PBT with PBT/polyalkylene isophthalate, and the like are preferred. Examples of the diene elastomer resin include rubber materials prepared by polymerization of a diene monomer, such as polybutadiene, polyisoprene, and polychloroprene. Elastomer resins such as urethane rubber, silicone rubber, and fluororubber may also be used.

The calcium carbonate used in the present embodiment is most preferably used singly but may be used as a mixture with a conventionally used inorganic filler such as barium sulfate, titanium oxide, and talc, as needed. The resin composition in the embodiment can contain common additives such as an antioxidant, a heat stabilizer, an ultraviolet absorber, a fibrous reinforcement, a lubricant, a flame retardant, an antistatic agent, a coloring agent, and a pigment. The content of these additives is preferably 10% by mass or less of the resin composition.

A third embodiment of the present invention relates to a method for producing a calcium carbonate containing substantially ring-like particles. The method comprises the steps of adding carbon dioxide to an aqueous calcium carbonate dispersion under atmospheric pressure to reduce the pH of the aqueous calcium carbonate dispersion to 9.0 or less; and then increasing the pH of the aqueous calcium carbonate dispersion to grow calcium carbonate particles. The outline of the embodiment is a method for giving a calcium carbonate having an intended shape, an intended BET specific surface area, and an intended average particle size by growing crystals from an aqueous calcium carbonate dispersion as a material, or is a production method relating to Ostwald ripening.

The calcium carbonate dispersed in the aqueous calcium carbonate dispersion used as the material in the present embodiment can be either ground calcium carbonate (natural calcium carbonate) prepared by pulverization and classification of limestone or precipitated calcium carbonate (synthetic calcium carbonate) prepared by chemical reaction. The material calcium carbonate may be any of polymorphs such as calcite crystals (trigonal rhombohedral crystals), aragonite crystals (orthorhombic crystals), and vaterite crystals (hexagonal crystals), but the calcite crystals of calcium carbonate are preferably used. The calcium carbonate may have any particle size (number-based average particle size as determined by electron microscopy), but a calcium carbonate preferably having a number-based average particle size of 20 to 500 nm, more preferably 30 to 100 nm, can be used. The calcium carbonate may have any BET specific surface area (JIS Z 8830), but to produce a calcium carbonate having an intended BET specific surface area by the present embodiment, an aqueous calcium carbonate dispersion in which a calcium carbonate having a BET specific surface area of about 2 to 50 $m^2/g$ is dispersed in water is preferably used.

First, an aqueous calcium carbonate dispersion in which calcium carbonate is dispersed in water is prepared. The aqueous calcium carbonate dispersion in the present description means a slurry in which calcium carbonate is suspended or dispersed in water. To prepare the aqueous calcium carbonate dispersion, calcium carbonate can be mixed with water, and the mixture can be appropriately stirred by a conventional method such as stirring with a stirrer and stirring by sonication. An aqueous calcium carbonate dispersion produced by the commonly known Shiraishi method can also be used directly. After preparation of the aqueous calcium carbonate dispersion, the pH of the aqueous calcium carbonate dispersion is reduced to 9.0 or less. In the present embodiment, the pH of the aqueous calcium carbonate dispersion is preferably reduced to 9.0 or less and 6.5 or more by adding carbon dioxide to the aqueous calcium carbonate dispersion under atmospheric pressure. The carbon dioxide to be added to the aqueous calcium carbonate dispersion is preferably in the gaseous state. Specifically, while the aqueous calcium carbonate dispersion is stirred with a stirrer or the like under atmospheric pressure, carbon dioxide gas can be blown and bubbled. The carbon dioxide is dissolved in water, and the aqueous calcium carbonate dispersion becomes slightly acidic. Accordingly, a trace amount of calcium carbonate is dissolved. In other words, a calcium carbonate having a relatively small particle size and contained in the aqueous calcium carbonate dispersion is at least partially dissolved in water. In contrast, at least the periphery of a calcium carbonate having a relatively large particle size is dissolved to give a calcium carbonate having a slightly smaller particle size.

Next, the pH of the aqueous calcium carbonate dispersion is increased. To increase the pH of the aqueous calcium carbonate dispersion, the following methods can be used: the aqueous calcium carbonate dispersion is allowed to stand; the aqueous calcium carbonate dispersion is stirred; the aqueous calcium carbonate dispersion is depressurized; the aqueous calcium carbonate dispersion is heated; and a basic substance is added to the aqueous calcium carbonate dispersion. The carbon dioxide gas added in the foregoing step gradually evaporates from the water even when the aqueous calcium carbonate dispersion is simply allowed to stand, and this increases the pH of the aqueous calcium carbonate dispersion. To more efficiently increase the pH of the aqueous calcium carbonate dispersion, the aqueous calcium carbonate dispersion is preferably stirred, depressurized, or heated, or a basic substance is preferably added. The aqueous calcium carbonate dispersion is more preferably heated with gentle stirring, and this method is simple. In the case of heating, the aqueous calcium carbonate dispersion is preferably gradually heated to a temperature higher than room temperature (25° C.), specifically to about 50° C., preferably to about 70° C., and more preferably to about 100° C. In the case of depressurizing, the aqueous calcium carbonate dispersion is preferably depressurized to a pressure less than atmospheric pressure, specifically to a pressure of about $10^2$ to $1 \times 10^5$ Pa. Examples of the basic substance to be added to the aqueous calcium carbonate dispersion include inorganic bases such as ammonia, sodium hydroxide, magnesium hydroxide, and calcium hydroxide, organic bases such as amines and pyridines, and combinations thereof. When the pH of the aqueous calcium carbonate dispersion is increased, the calcium carbonate dissolved in the foregoing step gradually crystallizes. During the crystallization, a recrystallization phenomenon in which calcium carbonate gathers around the particles remaining in the aqueous calcium carbonate dispersion and aggregates is observed, and substantially cubic, substantially rectangular parallelepipedic, or substantially rhombohedral particles are formed. Meanwhile, it has been revealed that substantially ring-like calcium carbonate is also formed in the step. The mechanism of forming substantially ring-like calcium carbonate is not exactly clear but is probably as follows: the spheroidal calcium carbonate having a relatively small size and formed in the step of reducing the pH partly has lattice defects; and pores are formed around the lattice defects in the step of increasing the pH. In the present embodiment, as described above, the ring-like shape generally means a shape having a single pore (ring) and a shape having a cavity (hollow) and includes not only a circular shape and an annular shape but also polygonal shapes, such as a triangular shape and a quadrangular shape, each having a single pore or a cavity and a tubular shape. In the present embodiment, the substantially ring-like shape includes not only a completely continuous ring-like shape but also an incompletely continuous ring-like shape such as a C shape. The calcium carbonate produced by the production method in the embodiment partially comprises such substantially ring-like particles as described above. The substantially ring-like calcium carbonate has a size of about 10 to 150 nm. In the production method in the embodiment, the step of reducing the pH of the aqueous calcium carbonate dispersion and the step of increasing the pH of the aqueous calcium carbonate dispersion can be repeated to produce a calcium carbonate having an intended BET specific surface area and/or an intended average particle size.

The calcium carbonate produced by the production method in the embodiment comprises, in addition to the substantially ring-like particles, particles having spherical, substantially cubic, substantially rectangular parallelepipedic, substantially rhombohedral, spindle, acicular, and other shapes. The calcium carbonate produced by the production method in the embodiment may comprise partially concave particles having spherical, substantially rectangular parallelepiped, substantially rhombohedral, and other shapes, or a shape having an incomplete pore, for example. The calcium carbonate produced by the production method in the embodiment is preferably the calcium carbonate in the first embodiment having the calcite structure, having a BET specific surface area of 2 to 50 $m^2/g$, having a number-based average particle size of 30 nm to 1.0 μm as determined by electron microscopy, and partially comprising substantially ring-like particles. The calcium carbonate may be surface-treated with surface treatment agents selected from the group consisting of fatty acids and derivatives thereof, resin acids and derivatives thereof, silica, an organic silicon compounds, condensed phosphoric acids, and condensed phosphates. The calcium carbonate can also be mixed with an appropriate resin to give a resin composition.

A fourth embodiment of the present invention relates to a method for growing crystals of a calcium carbonate containing substantially ring-like particles. The method comprises the steps of adding carbon dioxide to an aqueous calcium carbonate dispersion under atmospheric pressure to reduce the pH of the aqueous calcium carbonate dispersion to 9.0 or less; and then increasing the pH of the aqueous calcium carbonate dispersion to grow calcium carbonate particles. The outline of the embodiment is a method for giving a calcium carbonate having an intended shape, an intended BET specific surface area, and an intended average particle size by growing crystals from an aqueous calcium carbonate dispersion as a material, or is a crystal growth method relating to Ostwald ripening.

As with the third embodiment, the calcium carbonate dispersed in the aqueous calcium carbonate dispersion used as the material in the present embodiment can be either ground calcium carbonate (natural calcium carbonate) prepared by pulverization and classification of limestone or precipitated calcium carbonate (synthetic calcium carbonate) prepared by chemical reaction. The calcium carbonate may be any of polymorphs such as calcite crystals (trigonal rhombohedral crystals), aragonite crystals (orthorhombic crystals), and vaterite crystals (hexagonal crystals), but the calcite crystals of calcium carbonate are preferably used. The calcium carbonate may have any particle size (number-based average particle size as determined by electron microscopy), but a calcium carbonate preferably having a number-based average particle size of 20 to 500 nm, more preferably 30 to 100 nm, can be used. The calcium carbonate may have any BET specific surface area, but to produce a calcium carbonate having an intended BET specific surface area by the present embodiment, an aqueous calcium carbonate dispersion in which a calcium carbonate having a BET specific surface area of about 2 to 50 $m^2/g$ is dispersed in water is preferably used.

First, an aqueous calcium carbonate dispersion in which calcium carbonate is dispersed in water is prepared. The aqueous calcium carbonate dispersion in the present description means a slurry in which calcium carbonate is suspended or dispersed in water. To prepare the aqueous calcium carbonate dispersion, calcium carbonate can be mixed with water, and the mixture can be appropriately stirred by a conventional method such as stirring with a stirrer and stirring by sonication. An aqueous calcium carbonate dispersion produced by the conventionally known Shiraishi method can also be used directly. After preparation of the aqueous calcium carbonate dispersion, the pH of the aqueous calcium carbonate dispersion is reduced to 9.0 or less. In the present embodiment, the pH of the aqueous calcium carbonate dispersion is preferably reduced to 9.0 or less and 6.5 or more by adding carbon dioxide to the aqueous calcium carbonate dispersion under atmospheric pressure. The carbon dioxide to be added to the aqueous calcium carbonate dispersion is preferably in the gaseous state. Specifically, while the aqueous calcium carbonate dispersion is stirred with a stirrer or the like under atmospheric pressure, carbon dioxide gas can be blown and bubbled. The carbon dioxide is dissolved in water, and the aqueous calcium carbonate dispersion becomes slightly acidic. Accordingly, a trace amount of calcium carbonate is dissolved. In other words, a calcium carbonate having a relatively small particle size and contained in the aqueous calcium carbonate dispersion is at least partially dissolved in water. In contrast, at least the periphery of a calcium carbonate having a relatively large particle size is dissolved to give a calcium carbonate having a slightly smaller particle size.

Next, the pH of the aqueous calcium carbonate dispersion is increased. To increase the pH of the aqueous calcium carbonate dispersion, the following methods can be used: the aqueous calcium carbonate dispersion is allowed to stand; the aqueous calcium carbonate dispersion is stirred; the aqueous calcium carbonate dispersion is depressurized; the aqueous calcium carbonate dispersion is heated; and a basic substance is added to the aqueous calcium carbonate dispersion. The carbon dioxide gas added in the foregoing step gradually evaporates from the water even when the aqueous calcium carbonate dispersion is simply allowed to stand, and this increases the pH of the aqueous calcium carbonate dispersion. To more efficiently increase the pH of the aqueous calcium carbonate dispersion, the aqueous calcium carbonate dispersion is preferably stirred, depressurized, or heated, or a basic substance is preferably added. The aqueous calcium carbonate dispersion is more preferably heated with gentle stirring, and this method is simple. In the case of heating, the aqueous calcium carbonate dispersion is preferably gradually heated to a temperature higher than room temperature (25° C.), specifically to about 50° C., preferably to about 70° C., and more preferably to about 100° C. In the case of depressurizing, the aqueous calcium carbonate dispersion is preferably depressurized to a pressure less than atmospheric pressure, specifically to a pressure of about $10^2$ to $1 \times 10^5$ Pa. Examples of the basic substance to be added to the aqueous calcium carbonate dispersion include inorganic bases such as ammonia, sodium hydroxide, magnesium hydroxide, and calcium hydroxide, organic bases such as amines and pyridines, and combinations thereof. When the pH of the aqueous calcium carbonate dispersion is increased, the calcium carbonate dissolved in the foregoing step gradually crystallizes. During the crystallization, a recrystallization phenomenon in which calcium carbonate gathers around the particles remaining in the aqueous calcium carbonate dispersion and aggregates is observed, and substantially cubic, substantially rectangular parallelepipedic, or substantially rhombohedral particles are formed. Meanwhile, substantially ring-like calcium carbonate is also formed in the step. The mechanism of forming substantially ring-like calcium carbonate is not exactly clear but is probably as follows: the spheroidal calcium carbonate having a relatively small size and formed in the step of reducing the pH partly has lattice defects; and pores are formed around the lattice defects in the step of increasing the pH. In the present embodiment, as described above, the ring-like shape generally means a shape having a single pore (ring) and a shape having a cavity (hollow) and includes not only a circular shape and an annular shape but also polygonal shapes, such as a triangular shape and a quadrangular shape, each having a single pore or a cavity and a tubular shape. In the present embodiment, the substantially ring-like shape includes not only a completely continuous ring-like shape but also an incompletely continuous ring-like shape such as a C shape. The calcium carbonate produced by the production method in the embodiment partially comprises such substantially ring-like particles as described above. The substantially ring-like calcium carbonate has a size of about 10 to 150 nm. In the crystal growth method in the embodiment, the step of reducing the pH of the aqueous calcium carbonate dispersion and the step of increasing the pH of the aqueous calcium carbonate dispersion can be repeated to grow a calcium carbonate having an intended BET specific surface area and/or an intended average particle size.

The calcium carbonate produced by the crystal growth method in the embodiment comprises, in addition to the substantially ring-like particles, particles having spherical, substantially cubic, substantially rectangular parallelepipedic, substantially rhombohedral, spindle, acicular, and other shapes. The calcium carbonate produced by the crystal growth method in the embodiment may comprise partially concave particles having spherical, substantially rectangular parallelepiped, substantially rhombohedral, and other shapes, or a shape having an incomplete pore, for example. The calcium carbonate produced by the method in the embodiment is preferably the calcium carbonate in the first embodiment having the calcite structure, having a BET specific surface area of 2 to 50 $m^2/g$, having a number-based average particle size of 30 nm to 1.0 μm as determined by electron microscopy, and partially comprising substantially ring-like particles. The calcium carbonate may be surface-treated with surface treatment agents selected from the group consisting of fatty acids and derivatives thereof, resin acids and derivatives thereof, silica, organic silicon compounds, condensed phosphoric acids, and condensed phosphates. The calcium carbonate can also be mixed with an appropriate resin to give a resin composition.

As described above, the calcium carbonate in the first embodiment, the calcium carbonate produced by the production method in the third embodiment, or the calcium carbonate obtained by the method in the fourth embodiment partially comprises substantially ring-like particles. In other words, the calcium carbonates in these embodiments comprise substantially ring-like primary particles. The calcium carbonate comprising substantially ring-like particles can be used directly, or the substantially ring-like particles can be selectively separated. To separate the substantially ring-like particles, for example, the calcium carbonate can be sieved to collect calcium carbonate particles having particle sizes in a particular range, and only the substantially ring-like particles can be separated by observation under a microscope.

The calcium carbonate in the first embodiment, the calcium carbonate produced by the production method in the third embodiment, or the calcium carbonate obtained by the method in the fourth embodiment can be mixed with various resins and be used as a resin composition. The calcium carbonate can be used as an inorganic filler for resins and can also be used as a loading material for paper, paints, inks, and the like. The calcium carbonate can also be used as a filler for foods, cosmetics, and the like. The substantially ring-like calcium carbonate prepared by separation should be used as, for example, a mold for a nanomaterial, a drug carrier, a catalyst support, or a lightweight filler, by using its special shape.

EXAMPLES

Examples of the present invention will next be specifically described. Without departing from the scope, the present invention is not limited to the following examples.

[Preparation of Aqueous Calcium Carbonate Dispersion]

In a flask, a calcium carbonate having a BET specific surface area of 54.5 $m^2/g$ (JIS Z 8830) and having a number-based average particle size of 30 nm as determined by electron microscopy and water were placed, and the mixture was vigorously stirred with a stirrer to give an aqueous calcium carbonate dispersion (aqueous calcium carbonate slurry) having a solid content of 10% by weight.

[Addition of Carbon Dioxide to Aqueous Calcium Carbonate Dispersion]

While the resulting aqueous calcium carbonate dispersion was gently stirred under atmospheric pressure at room temperature (25° C.), a mixed gas of carbon dioxide (30% by volume) and clean air (70% by volume) was bubbled at 8.0 L/min relative to 100 g of the solid content of the aqueous calcium carbonate slurry. The carbon dioxide bubbling was continued until the pH of the aqueous calcium carbonate dispersion decreased to 6.8.

[Increase in pH of Aqueous Calcium Carbonate Dispersion]

While the resulting aqueous calcium carbonate dispersion was gently stirred, the flask was heated with a heater at a rate of 12° C./min until the temperature in the flask reached 95° C. After the temperature in the flask reached 95° C., the temperature was maintained, and the dispersion was stirred for 20 minutes while samples were collected at predetermined times.

[Treatment of Collected Samples]

An aqueous calcium carbonate dispersion sampled at a predetermined time was immediately washed with acetone to stop the crystal growth and was filtered under reduced pressure. The product was dried under vacuum to give a white calcium carbonate in the solid state. The collected calcium carbonate was dispersed in isopropyl alcohol (IPA), and the dispersion was dropped on a copper grid with a carbon-reinforced collodion support membrane. The IPA was evaporated, and the residue was vacuum-dried, giving a sample for transmission electron microscopy (TEM). The sample was observed by an electron microscope (apparatus name: JEOL JEM-2100).

Figure 2:
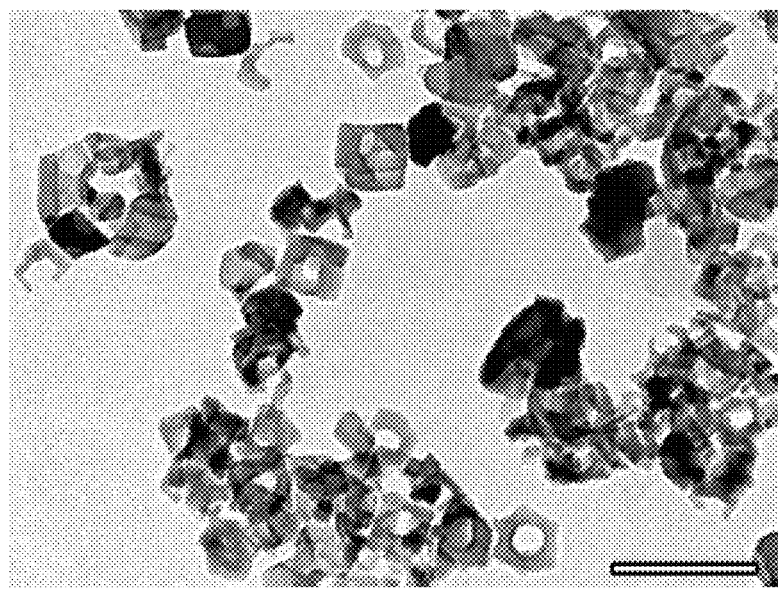
FIG. 2 is an electron micrograph of calcium carbonate particles in the aqueous calcium carbonate dispersion when the dispersion temperature reached 95° C. during heating.
Figure 3:
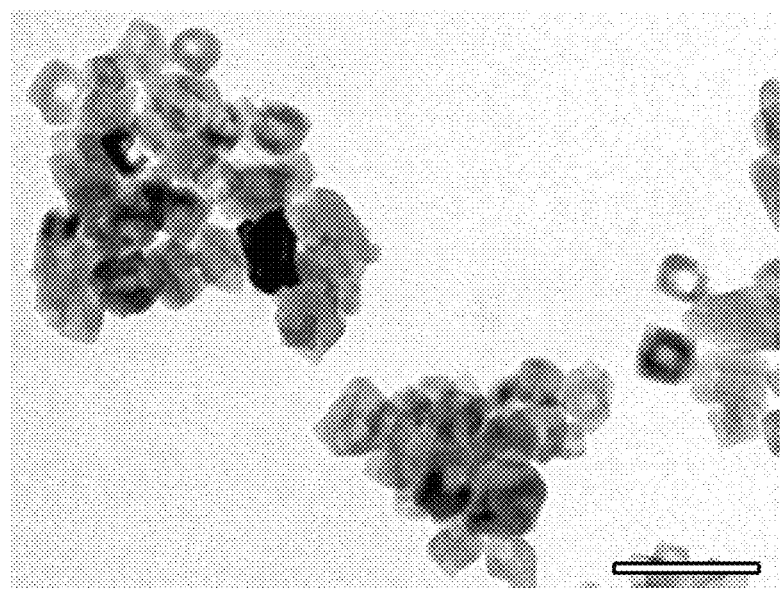
FIG. 3 is an electron micrograph of calcium carbonate particles in the aqueous calcium carbonate dispersion when the dispersion was stirred for 10 minutes after the dispersion temperature reached 95° C.
Figure 4:
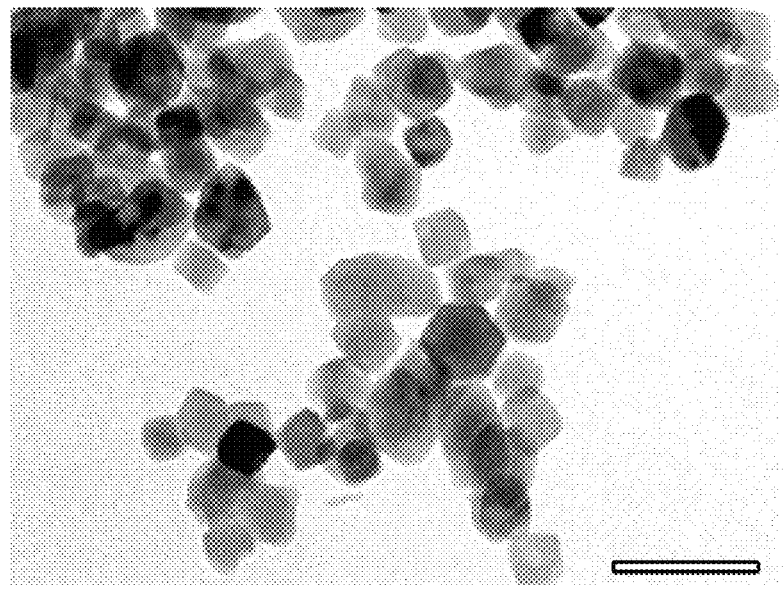
FIG. 4 is an electron micrograph of calcium carbonate particles in the aqueous calcium carbonate dispersion when the dispersion was stirred for 20 minutes after the dispersion temperature reached 95° C.

FIG. 1 is an electron micrograph of calcium carbonate particles in the aqueous calcium carbonate dispersion before heating (magnification: ×40,000). FIG. 2 is an electron micrograph of calcium carbonate particles in the aqueous calcium carbonate dispersion when the dispersion temperature reached 95° C. during heating (magnification: ×40,000). FIG. 3 is an electron micrograph of calcium carbonate particles in the aqueous calcium carbonate dispersion when the dispersion was stirred for 10 minutes after the dispersion temperature reached 95° C. (magnification: ×40,000). FIG. 4 is an electron micrograph of calcium carbonate particles in the aqueous calcium carbonate dispersion when the dispersion was stirred for 20 minutes after the dispersion temperature reached 95° C. (magnification: ×40,000). In each micrograph, the scale bar has a length of 200 nm. In particular, in the electron micrograph in FIG. 2, a plurality of substantially ring-like calcium carbonate particles are observed. A substantially ring-like calcium carbonate particle observed in the lower part of FIG. 2 has a size (outer diameter) of about 60 nm. A smaller number of substantially ring-like calcium carbonate particles are observed in the micrographs of FIG. 3 and FIG. 4. In the micrograph of FIG. 1, any substantially ring-like calcium carbonate particles are not observed. This result reveals that substantially ring-like calcium carbonate particles are formed during the step of stirring the aqueous calcium carbonate dispersion under heating to increase the pH of the aqueous calcium carbonate dispersion. The BET specific surface areas of the calcium carbonate particles in FIGS. 1, 2, 3, and 4 were determined in accordance with JIS Z 8830 to be 54.5 m$^2$/g, 43.1 m$^2$/g, 25.3 m$^2$/g, and 22.9 m$^2$/g, respectively, and the number-based average particle sizes of the calcium carbonate particles in FIGS. 1, 2, 3, and. 4 were determined by electron microscopy to be 30.8 nm, 64.0 nm, 69.9 nm, and 72.4 nm, respectively.

What is claimed is:

1. A method for producing a calcium carbonate containing substantially ring-like particles, the method comprising the steps of:
    adding carbon dioxide to an aqueous calcium carbonate dispersion at room temperature and under atmospheric pressure to reduce a pH of the aqueous calcium carbonate dispersion to 9.0 or less; and then
    increasing the pH of the aqueous calcium carbonate dispersion to grow calcium carbonate particles.

2. The method for producing a calcium carbonate containing substantially ring-like particles according to claim 1, wherein the calcium carbonate containing substantially ring-like particles is a calcium carbonate having a calcite structure, having a BET specific surface area of 2 to 50 m$^2$/g, and having a number-based average particle size of 30 nm to 1.0 mm as determined by electron microscopy.

3. The method for producing a calcium carbonate containing substantially ring-like particles according to claim 2, wherein the increasing the pH of the aqueous calcium carbonate dispersion is performed by methods selected from the group consisting of allowing the aqueous calcium carbonate dispersion to stand, stirring the aqueous calcium carbonate dispersion, depressurizing the aqueous calcium carbonate dispersion, heating the aqueous calcium carbonate dispersion, and adding basic substances to the aqueous calcium carbonate dispersion.

4. The method for producing a calcium carbonate containing substantially ring-like particles according to claim 2, wherein the reducing the pH of the aqueous calcium carbonate dispersion to 9.0 or less and the increasing the pH of the aqueous calcium carbonate dispersion are repeated.

5. The method for producing a calcium carbonate containing substantially ring-like particles according to claim 2, wherein a number-based average particle size of the calcium carbonate particles is 30 nm to 100 nm as determined by electron microscopy.

6. The method for producing a calcium carbonate containing substantially ring-like particles according to claim 2, wherein the size of the substantially ring-like calcium carbonate particles is 10 to 150 nm.

7. The method for producing a calcium carbonate containing substantially ring-like particles according to claim 1, wherein the increasing the pH of the aqueous calcium carbonate dispersion is performed by methods selected from the group consisting of allowing the aqueous calcium carbonate dispersion to stand, stirring the aqueous calcium carbonate dispersion, depressurizing the aqueous calcium carbonate dispersion, heating the aqueous calcium carbonate dispersion, and adding basic substances to the aqueous calcium carbonate dispersion.

8. The method for producing a calcium carbonate containing substantially ring-like particles according to claim 7, wherein the reducing the pH of the aqueous calcium carbonate dispersion to 9.0 or less and the increasing the pH of the aqueous calcium carbonate dispersion are repeated.

9. The method for producing a calcium carbonate containing substantially ring-like particles according to claim 1, wherein the reducing the pH of the aqueous calcium carbonate dispersion to 9.0 or less and the increasing the pH of the aqueous calcium carbonate dispersion are repeated.

10. A method for growing crystals of a calcium carbonate containing substantially ring-like particles, the method comprising the steps of:
    adding carbon dioxide to an aqueous calcium carbonate dispersion at room temperature and under atmospheric pressure to reduce a pH of the aqueous calcium carbonate dispersion to 9.0 or less; and then
    increasing the pH of the aqueous calcium carbonate dispersion to grow calcium carbonate crystals.

11. The method for growing crystals of a calcium carbonate containing substantially ring-like particles according to claim 10, wherein the calcium carbonate containing substantially ring-like particles is a calcium carbonate having a calcite structure, having a BET specific surface area of 2 to 50 m$^2$/g, and having a number-based average particle size of 30 nm to 1.0 mm as determined by electron microscopy.

12. The method for growing crystals of a calcium carbonate containing substantially ring-like particles according to claim 11, wherein the increasing the pH of the aqueous calcium carbonate dispersion is performed by methods selected from the group consisting of allowing the aqueous calcium carbonate dispersion to stand, stirring the aqueous calcium carbonate dispersion, depressurizing the aqueous calcium carbonate dispersion, heating the aqueous calcium carbonate dispersion, and adding basic substances to the aqueous calcium carbonate dispersion.

13. The method for growing crystals of a calcium carbonate containing substantially ring-like particles according to claim 11, wherein the reducing the pH of the aqueous calcium carbonate dispersion to 9.0 or less and the increasing the pH of the aqueous calcium carbonate dispersion are repeated.

14. The method for growing crystals of a calcium carbonate containing substantially ring-like particles according to claim 11, wherein a number-based average particle size of the calcium carbonate particles is 30 nm to 100 nm as determined by electron microscopy.

15. The method for growing crystals of a calcium carbonate containing substantially ring-like particles according to claim 11,
wherein the size of the substantially ring-like calcium carbonate particles is 10 to 150 nm.

16. The method for growing crystals of a calcium carbonate containing substantially ring-like particles according to claim 10, wherein the increasing the pH of the aqueous calcium carbonate dispersion is performed by methods selected from the group consisting of allowing the aqueous calcium carbonate dispersion to stand, stirring the aqueous calcium carbonate dispersion, depressurizing the aqueous calcium carbonate dispersion, heating the aqueous calcium carbonate dispersion, and adding basic substances to the aqueous calcium carbonate dispersion.

17. The method for growing crystals of a calcium carbonate containing substantially ring-like particles according to claim 16, wherein the reducing the pH of the aqueous calcium carbonate dispersion to 9.0 or less and the increasing the pH of the aqueous calcium carbonate dispersion are repeated.

18. The method for growing crystals of a calcium carbonate containing substantially ring-like particles according to claim 10, wherein the reducing the pH of the aqueous calcium carbonate dispersion to 9.0 or less and the increasing the pH of the aqueous calcium carbonate dispersion are repeated.

* * * * *